United States Patent
Drossel

(10) Patent No.: US 8,482,143 B2
(45) Date of Patent: Jul. 9, 2013

(54) METHOD FOR CONTROLLING THE ROTATIONAL SPEED OF A WIND TURBINE

(75) Inventor: Detlef Drossel, Norderstedt (DE)

(73) Assignee: Nordex Energy GmbH, Hamburg (DE)

( * ) Notice: Subject to any disclaimer, the term of this patent is extended or adjusted under 35 U.S.C. 154(b) by 151 days.

(21) Appl. No.: 13/215,613

(22) Filed: Aug. 23, 2011

(65) Prior Publication Data

US 2012/0056427 A1    Mar. 8, 2012

(30) Foreign Application Priority Data

Sep. 6, 2010   (DE) .......................... 10 2010 044 433

(51) Int. Cl.
*F03D 7/00*   (2006.01)
(52) U.S. Cl.
USPC .............................................. 290/44; 290/55
(58) Field of Classification Search
USPC ..................................................... 290/44, 55
See application file for complete search history.

(56) References Cited

U.S. PATENT DOCUMENTS

| 7,309,930 | B2 | 12/2007 | Suryanarayanan et al. | |
| 7,352,075 | B2 * | 4/2008 | Willey et al. | 290/44 |
| 7,400,055 | B2 | 7/2008 | Nagao | |
| 7,423,352 | B2 | 9/2008 | Suryanarayanan et al. | |
| 7,863,767 | B2 * | 1/2011 | Chapple et al. | 290/54 |
| 8,044,529 | B2 | 10/2011 | Egedal | |
| 8,212,373 | B2 * | 7/2012 | Wittekind et al. | 290/44 |

FOREIGN PATENT DOCUMENTS

EP    2 063 110 A1    5/2009

* cited by examiner

*Primary Examiner* — Tho D Ta
(74) *Attorney, Agent, or Firm* — Walter Ottesen, P.A.

(57) ABSTRACT

A method controls the rotational speed of a wind turbine having a tower, a nacelle mounted on the tower and a drive train which includes a rotor having at least one rotor blade. The rotor is rotatably mounted about a rotor axis in the nacelle. The drive train further includes a generator configured to be driven by the rotor. In a nacelle-fixed reference system, the rotational speed ($\omega_G^*$) of a component of the drive train which rotates with the rotor in correspondence to a transmission ratio (Ue) is measured. A movement of the nacelle relative to the ground is measured and the rotational speed is controlled to a rotational speed setpoint with a speed controller which outputs a generator torque ($M_G$) and/or a blade pitch angle ($\theta$). The measured rotational speed ($\omega_G^*$) is converted into a corrected rotational speed ($\omega_{GC}$) which corresponds to the rotational speed of the rotor in a ground-fixed reference system multiplied by the transmission ratio (Ue). The corrected rotational speed ($\omega_{GC}$) is used as the input quantity for the speed controller.

16 Claims, 3 Drawing Sheets

METHOD FOR CONTROLLING THE ROTATIONAL SPEED OF A WIND TURBINE

CROSS REFERENCE TO RELATED APPLICATION

This application claims priority of German patent application no. 10 2010 044 433.2, filed Sep. 6, 2010, the entire content of which is incorporated herein by reference.

FIELD OF THE INVENTION

The invention relates to a method for controlling the rotational speed of a wind turbine which has a tower, a nacelle fixed on the tower, and a drive train which includes a rotor with at least one rotor blade rotatably mounted about an axis in the nacelle and a generator driven by the rotor. The invention also relates to such a wind turbine. In the method, a rotational speed of a drive train element, which rotates with the rotor according to a gear ratio, is measured. The movement of the nacelle relative to the ground is also measured. The control of the rotational speed to a speed setpoint is accomplished with a speed controller which gives a generator torque and/or a blade pitch angle.

BACKGROUND OF THE INVENTION

Such a method is disclosed in U.S. Pat. No. 7,309,930 which relates to a vibration damping system. In the known method, the generator speed is measured and supplied to a speed regulator as an input quantity. The speed regulator determines a setpoint for the generator torque from the measured generator speed. In order to counteract vibrations of the system, the setpoint of the generator torque determined by the speed regulator is modulated. For this, a vibration damper generates an output signal which provides an additional torque for the generator. The output signal is calculated on the basis of the measured generator speed, whereby the frequency components of the generator speed signal which correspond to those vibration frequencies which are to be dampened flow in more intensely. The additional generator torque is to counteract the vibrations of the drive train as well as of the tower. In order to match the frequency behavior of the vibration damper to the wind turbine, the natural or resonant frequencies which are to be dampened are determined. For this, it is, inter alia, contemplated to evaluate signals of an acceleration sensor.

U.S. Pat. No. 7,400,055 discloses a similar method in which a sensor detects vibrations perpendicular to the rotor axis and an open-loop control influences the rotor in such a manner that the vibrations are dampened. The influencing of the rotor can be achieved via the generator torque or the blade pitch angle.

The common characteristic of the two known methods is that the occurring tower vibrations are to be counteracted by additional torque applied to the rotor. The methods rely on a correlation between the additionally applied torque and a counter torque resulting therefrom on the tower, more specifically, on the nacelle of the wind turbine. The exact correlation depends on the configuration of the wind turbine. Furthermore, external influences such as, for example, wind shear and oblique flows, which constantly change and are difficult to determine, play a major role.

SUMMARY OF THE INVENTION

Starting from this basis, it is an object of the invention to provide a method for the speed control of a wind turbine and a wind turbine in which the occurrence of tower oscillations is reduced.

The method of the invention is for controlling the speed of a wind turbine having a tower, a nacelle mounted on the tower and a drive train which includes a rotor having at least one rotor blade, the rotor being rotatably mounted about a rotor axis in the nacelle, and a generator configured to be driven by the rotor. The method includes the steps of: in a nacelle-fixed reference system, measuring the rotational speed ($\omega_G^*$) of an element of the drive train which rotates with the rotor in correspondence to a transmission ratio (Ue); measuring a movement of the nacelle relative to the ground; controlling the rotational speed to a rotational speed setpoint with a speed controller which outputs a generator torque ($M_G$) and/or a blade pitch angle ($\theta$); converting the rotational speed ($\omega_G^*$) into a corrected rotational speed ($\omega_{GC}$) which corresponds to the rotational speed of the rotor in a ground-fixed reference system multiplied by the transmission ratio (Ue); and, using the corrected rotational speed ($\omega_{GC}$) as the input quantity for the speed controller.

The method is suited for wind turbines of any construction, in particular, with an essentially horizontal rotor axis. In particular, this may relate to wind turbines which are operated with a variable rotational speed. The generator, in particular, a double-fed asynchronous generator, can be coupled to an electric grid via a converter having a direct current link. A gear box can be arranged between the rotor and the generator.

In the method, a rotational speed of a drive train element is measured. The drive train element can be the rotor. In this case the gear ratio is equal to one. The drive train element can alternatively be the rotor of the generator, then the gear ratio corresponds to the gear ratio of a gear box, if applicable, arranged between the rotor and the generator. The drive train element can also be any other element of the drive train, such as a shaft of a gear box arranged between the rotor and the generator. The gear ratio in this case corresponds to the ratio of the rotational speed of this drive train element and the rotor. The gear ratio can be predefined or can have changing values, in particular, when using a change gear or a stepped or continuous variable speed gear. The term rotational speed in the context of this application also includes a corresponding angular speed which differs from the rotational speed only by a constant factor of $2\pi$, in the strict sense of the word. Naturally, the rotational speed is measured in a nacelle-fixed reference system, for example, by an incremental encoder mounted in the nacelle.

The rotational speed is regulated to a rotational speed setpoint which, for example, is predetermined by a control system or a control of the wind turbine, in particular, in dependence on a measured wind speed. For this, a speed controller is used which determines a deviation of the measured rotational speed from the rotational speed setpoint and provides a generator torque and/or a blade pitch angle on the basis thereof. In a wind turbine operated with variable rotational speed, in which the generator is connected to an electric grid via a converter, it is often distinguished between part-load operation and full-load operation. During part-load operation the speed setpoint is predetermined in dependence on the wind speed in accordance with an optimal tip speed ratio. The blade pitch angle is held at a fixed value at which the rotor receives a maximum of torque from the wind, and the generator torque serves as the actuating variable. During full-load operation, the speed setpoint and the generator torque substantially correspond to their nominal values, so that the nominal power of the wind turbine is achieved. The actuating variable for the speed regulation then will be the blade pitch angle.

In the invention, the rotational speed measured in a nacelle-fixed reference system is converted into a corrected rotational speed. The corrected rotational speed indicates the rotational speed of the rotor in a ground-fixed reference system multiplied by the gear ratio, that is, the rotor rotational speed in the stationary reference system converted to the level of the drive train element used for the rotational speed measurement. This corrected rotational speed is used as input variable for the speed controller instead of the measured rotational speed. The speed regulation is carried out on the basis of the corrected rotational speed.

Converting the measured rotational speed into the corrected rotational speed is carried out on the basis of the measured movement of the nacelle relative to the ground. It is understood that the movement of the nacelle relative to the ground does not have to be effected completely, that is in all spatial directions and/or about multiple rotational axes. Furthermore, it is sufficient to measure a movement of the nacelle, from which at least approximate conclusions as to the measuring errors caused by the relative movement can be drawn.

The corrected rotational speed refers to a ground-fixed reference system, that is it describes the rotational speed independent of a relative movement between the nacelle and the ground. The term "ground" in this connection is to be equated in particular with the foundation of the wind turbine on which the tower stands. Because only the amount of the rotational speed is relevant in the speed regulation methods considered here, the direction of the rotor axis does not play any role. The reference system, which the rotational speed relates to, may have any orientation. Therefore, in the strict sense, it does not have to be firmly fixed to the ground but can, for example, follow a yaw adjustment of the nacelle. The wind turbine can have a yaw adjustment system by which the nacelle is rotated relative to the tower for the purpose of readjusting according to the wind direction.

The invention is based on the realization that, when measuring the rotational speed, systematic errors occur which are due to the relative movement between the nacelle and the ground. When the tower performs, for example, a lateral oscillatory movement, that is, an oscillatory movement directed orthogonally to a longitudinal axis of the tower and the rotor axis, the nacelle and with it the reference system in which the speed measurement is taking place, move approximately on a circular path. Even if the rotational speed of the rotor in a ground-fixed reference system were constant, it will change with such a movement of the nacelle relative to the ground, in particular, periodically in accordance with the oscillation movement of the nacelle. If the rotational speed measured in the nacelle-fixed reference system is taken as the basis of the control method, the apparent rotational speed deviations of the rotor are constantly counteracted. Because of this, counter torques are exerted onto the nacelle and/or the tower of the wind turbine with corresponding periodicity which, in the most unfavorable case, can increase the oscillation movement in a resonance-like manner.

In the present invention, these difficulties are avoided in that the measuring error of the rotational speed resulting from the oscillations is eliminated before it can affect the actuating variables of the speed control.

In comparison to the methods of counteracting the tower vibrations by means of an active damping with a particular frequency behavior, which methods are described initially herein and are known from the state of the art, this is not only easier but is not associated either with a function of the control loop impaired in certain frequency ranges.

In one embodiment, the compensation rotational speed is ascertained on the basis of the measured movement of the nacelle, which represents a rotation of the nacelle about the axis of the rotor, and the conversion of the measured rotational speed to the corrected rotational speed is effected by adding the measured rotational speed and the compensation rotational speed. In the case of the compensation rotational speed, it can pertain to a rotational speed or an angular speed of the nacelle about the rotor axis in the ground-fixed reference system, or to a rotational speed coupled hereto by a constant factor. Basically, the conversion of the measured rotational speed to the corrected rotational speed can be effected in any desired manner. Determining a compensation rotational speed and subsequently adding it to the measured rotational speed constitute an especially simple and clear solution.

Determining the compensation rotational speed can include a multiplication with the gear ratio between the measured rotational speed and the rotor rotational speed. This approach is based on the assumption that the moments of inertia to be observed are dominated by the rotor. Then the rotational speed of the rotor in the ground-fixed reference system remains approximately constant during tower oscillations. The systematic error of the measured rotational speed then is larger by a factor than the rotational speed describing the movement of the nacelle. The factor corresponds to the gear ratio between the measured rotational speed and the rotor rotational speed. It is taken into consideration when determining the compensation rotational speed, in particular, in that a determined rotational speed of the nacelle is multiplied by this factor. The compensation rotational speed then corresponds to the error of the measured rotational speed caused by the tower oscillations so that the summation theoretically results in the complete compensation of the measuring error.

In one embodiment, the measuring of the movement of the nacelle is effected by measuring an acceleration in a direction which is orthogonal to the axis of the rotor and orthogonal to a longitudinal axis of the tower. The linear acceleration in the above cited direction allows conclusions as to the amplitude of the tower oscillation which is decisive for the described measuring error. The measurement of the acceleration can, in particular, be achieved with an acceleration sensor which is arranged in the nacelle or in or on the top of the tower. Where appropriate, a plurality of acceleration sensors arranged on the top of the tower which measure acceleration in different directions can also be used. From the measurement values of the acceleration sensors arranged in this manner, the acceleration in the cited direction for each nacelle position can be calculated.

In one embodiment, determining the compensation rotational speed includes a division by an effective tower height which is less than the actual height of the tower. As described above, the amplitude of the tower oscillation is of importance for the measurement error of the rotational speed measured in the nacelle-fixed reference system. How the oscillation amplitude of the tower effects the angular position of the nacelle in the ground-fixed reference system is especially dependent on the mechanical characteristics of the tower. An exact calculation must take into consideration any bending of the tower and is difficult to manage. The use of an effective tower height represents a feasible approximate solution. The effective tower height is the tower height of a fictional tower assumed to be rigid, wherein, in the case of a certain oscillation amplitude, the top of the tower and/or the nacelle assumes the same angle of inclination as in the same oscillation amplitude of the real, bending tower. The effective tower height is less than the actual height of the tower. It can be determined by model calculations, estimations or measurements on actual towers.

In one embodiment, the measuring of the movement of the nacelle is carried out by measuring an angular acceleration about the axis of the rotor. In this measuring method, only that component of the movement of the nacelle which leads to the described falsification of the rotational speed is determined ab initio. This can simplify the conversion of the measured rotational speed to the corrected rotational speed.

In one embodiment, the determining of the compensation rotational speed includes the integration of a measured acceleration over time. In order for low-frequency signals, in particular, sensor offset errors not to result in errors during the integration, a high-pass filter can be used on the measured acceleration prior to integration.

In one embodiment, the measuring of the movement of the nacelle is effected by measuring an angle of the nacelle about the axis of the rotor relative to the ground. Repeated measuring of this angular position also enables determination of the rotation of the nacelle about an axis of the rotor which is relevant for the measuring error. In particular, an inclination sensor or a gyroscope sensor can be used for the measurement.

The wind turbine of the invention includes: a tower; a nacelle mounted on the tower; a drive train including a rotor and a generator configured to be driven by the rotor; the rotor having at least one rotor blade and being rotatably mounted about a rotor axis in the nacelle; a first measuring unit configured to measure a rotational speed ($\omega_G^*$) of an element of the drive train which rotates with the rotor in correspondence to a transmission ratio (Ue); a second measuring unit configured to measure a movement of the nacelle relative to the ground; a speed controller configured to control the rotational speed to a speed setpoint by outputting at least one of a generator torque ($M_G$) and a blade pitch angle ($\theta$); a converting unit configured to convert the rotational speed ($\omega_G^*$), measured in a nacelle-fixed reference system, into a corrected rotational speed ($\omega_{GC}$) which corresponds to the rotational speed of the rotor in a ground-fixed reference system multiplied by the transmission ratio (Ue); and, the speed controller being connected to the converting unit in such a manner that the speed controller uses the corrected rotational speed ($\omega_{GC}$) as an input quantity.

It is understood that parts of the wind turbine, in particular, the device for conversion can be realized in the form of software which runs on a control computer of the wind turbine. With regard to the illustration of the features of the wind turbine and the advantages, reference is made to the above illustrations of corresponding method features and advantages. The wind turbine is especially intended to execute the method described above.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
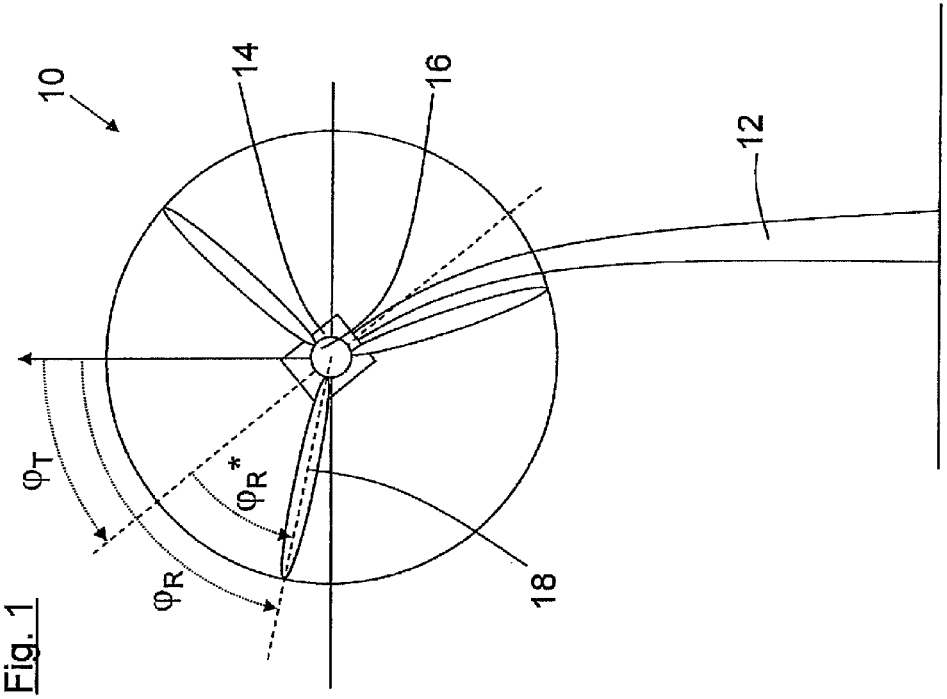
FIG. 1 shows a wind turbine according to the invention in a simplified, schematic view from the front.

FIG. 1 shows a wind turbine 10 having a tower 12, and a nacelle 14 mounted on the tower. The drive train of the wind turbine 10 includes a rotor 16 which is rotatably mounted in the nacelle 14 and comprises three rotor blades 18, as well as a generator, not shown in FIG. 1, which is arranged in the nacelle 14 and is driven by the rotor 16.

Further, three angles are shown in the FIGS which are defined as follows:

The angle $\phi_T$ refers to an angle of inclination of the nacelle 14 relative to the perpendicular, that is, in a ground-fixed reference system. The angle of inclination $\phi_T$ of the nacelle essentially corresponds to the inclination of the tower top resulting from the bending of the tower 12. The inclination $\phi_T$ results from a tower oscillation. The deflection and inclination of the nacelle 14 and the bending of the tower 12 are shown exaggerated in FIG. 1.

The angle $\phi_R$ refers to the angular position of the rotor, in the example, measured from a perpendicular, that is in a ground-fixed reference system, up to the center line of a rotor blade 18.

The third shown angle $\phi_R^*$ is the angular position of the same rotor blade 18 measured in a nacelle-fixed reference system, which, in FIG. 1, is inclined by an angle $\phi_T$ to the vertical line. This angle is referred to as $\phi_R^*$. The star (*) refers to a nacelle-fixed reference system, here as well as in further quantities explained below.

As can be gathered directly from the Figure, the following relationship between the three angles applies:

$$\phi_R^* = \phi_R - \phi_T \tag{1}$$

Differentiating as a function of time leads to the following relationship for the corresponding angular speeds which, as described above, are referred to as rotational speeds in this application:

$$\omega_R^* = \omega_R - \omega_T \tag{2}$$

$\omega_R^*$ is the measured rotational speed of the rotor in the nacelle-fixed reference system. Instead of this rotor rotational speed, it is also possible to contemplate a rotational speed of another drive train element coupled to the rotor rotational speed by a gear ratio Ue, for example, the generator rotational speed $\omega_G^*$ which is likewise related to the nacelle-fixed reference system:

$$\omega_G^* = Ue \cdot \omega_R^* = Ue \cdot \omega_R - Ue \cdot \omega_T \tag{3}$$

$$= \omega_G - Ue \cdot \omega_T. \tag{4}$$

$\omega_G^*$ corresponds to a directly measurable rotational speed of a drive train element, namely the generator or more precisely the rotor of the generator, which rotates with the rotor corresponding to the gear ratio Ue. $\omega_G = Ue \cdot \omega_R$ is a corrected rotational speed which indicates the rotational speed of the rotor in the ground-fixed reference system multiplied by the gear ratio. In the invention, this rotational speed is used as the basis of the speed regulation.

As can be gathered from the last equation, the rotational speed $\omega_G$ can be determined by the summation of the measured rotational speed $\omega_G^*$ and the term $Ue \cdot \omega_T$, which can approximately be determined as follows:

$$Ue \cdot \omega_T \approx Ue \cdot \int \frac{a}{L_T} \cdot dt = \omega_c \tag{5}$$

$\omega_C$ is the compensation rotational speed, a is the acceleration of the nacelle in a direction orthogonal to the longitudinal axis of the tower and to the rotational axis of the rotor, and $L_T$ is the effective tower height.

The mathematical relationships described above apply in general, independently of the embodiment shown here.

Figure 2:
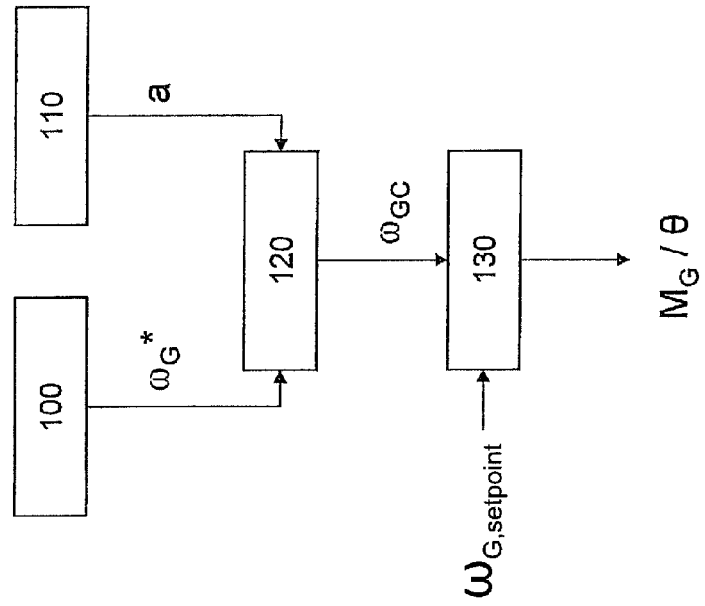
FIG. 2 shows a flow diagram to illustrate the method according to the invention.

FIG. 2 shows the following method steps: in step 100, a rotational speed of a drive train element rotating with the rotor is measured, in the example, the rotational speed of the generator. The result is the measured generator rotational speed $\omega_G^*$ in the nacelle-fixed reference system.

In step 110, a movement of the nacelle relative to the ground is measured. In the example, this results by measuring a linear acceleration a in a direction orthogonal to the tower axis and to the rotor axis. The result is the measured acceleration a.

In step 120, the measured rotational speed $\omega_G^*$ is converted into the corrected rotational speed $\omega_{GC}$. The rotational speed $\omega_{GC}$ corresponds to the rotational speed of the rotor in the ground-fixed reference system, converted to the generator end. For this, first of all, a compensation rotational speed $\omega_C$ is determined on the basis of the measured acceleration a. This is added to the measured rotational speed $\omega_G^*$.

In step 130, the speed regulation is carried out, whereby the corrected rotational speed $\omega_{GC}$ is used as the input value for the speed regulation. A further input value for the speed regulation is the desired setpoint $\omega_{G,setpoint}$. Output quantities of the speed regulation are the generator torque $M_G$ and/or a blade pitch angle $\theta$.

Figure 3:
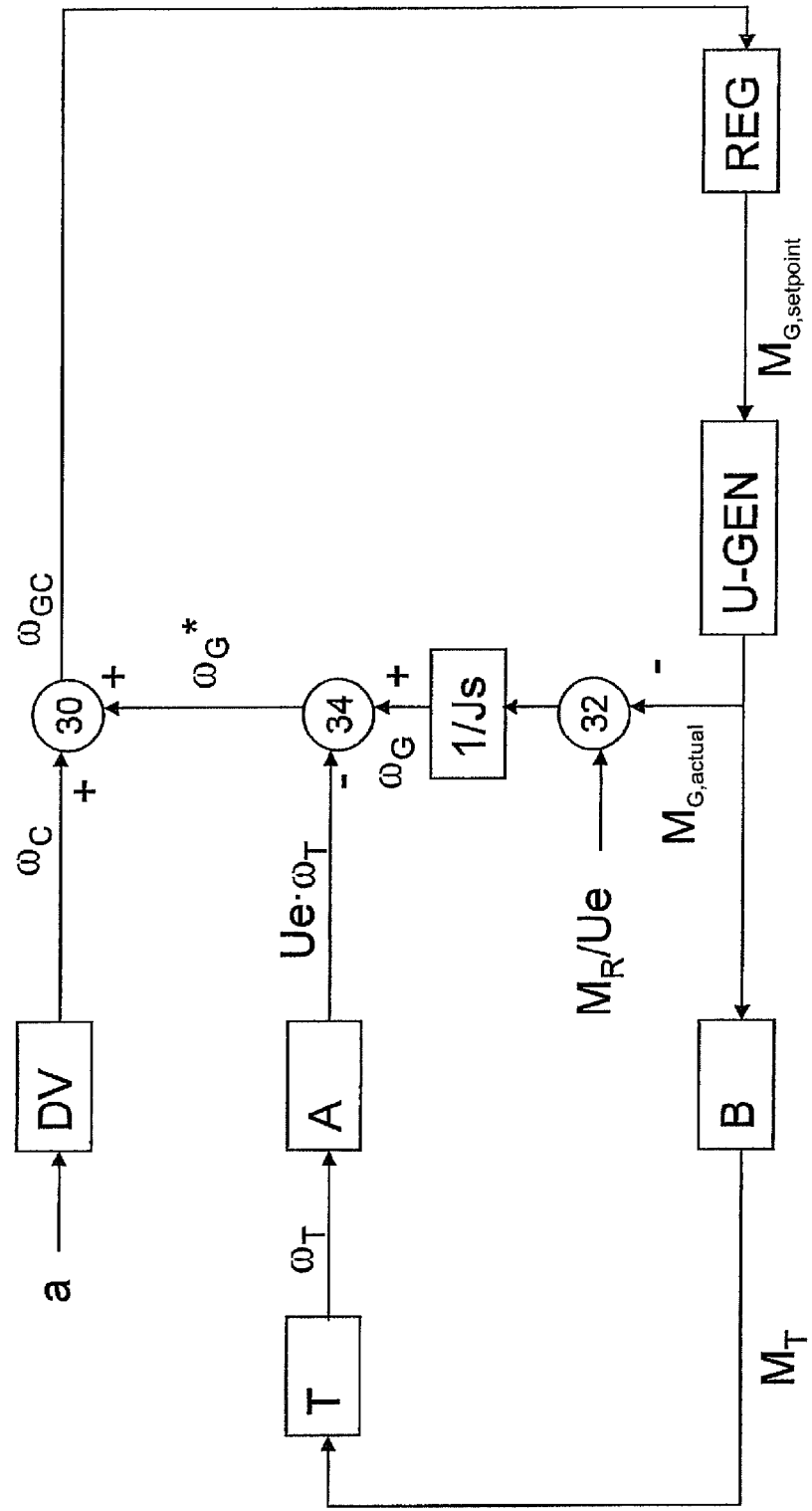
FIG. 3 shows a functional diagram for illustration of the interactions of the different physical quantities.

The relationships between the different physical quantities are described in more detail on the basis of the function diagram of FIG. 3. In the function diagram, the different values are coupled with each other by transfer functions which are each illustrated as boxes.

On the top left, the measured acceleration a of the nacelle is shown. The transfer function DV reproduces this acceleration a on the previously described compensation rotational speed $\omega_C$. At the connection 30, this compensation rotational speed $\omega_C$ is added to the generator rotational speed $\omega_G^*$ which is measured in the nacelle-fixed reference system. The result is the corrected rotational speed $\omega_{GC}$ which is converted into the setpoint value for the generator torque $M_{G,setpoint}$ via the transfer function REG of the speed regulator.

The transfer function U-GEN of the system consisting of main converter and generator generates therefrom the actual value of the generator torque $M_{G,actual}$. This actual value of the generator torque becomes a torque $M_T$ acting on the tower through the transfer function B. The transfer function T leads from the torque $M_T$ to a rotational speed $\omega_T$ of the tower or the nacelle and is determined by the mechanical characteristics of the tower. The tower forms a weakly dampened, oscillation-capable system which is stimulated by the torque $M_T$. The result is a rotational speed or an angular speed $\omega_T$ of the tower/nacelle, to be seen in the ground-fixed reference system.

From this, a rotational speed $Ue \cdot \omega_T$ results via the transfer function A, which is influenced by the characteristics of the drive train and the tower, especially by the gear ratio of the transmission. This mirrors the influence of the actual value of the generator torque $M_{G,actual}$ on the generator rotational speed insofar as it is conveyed via the tower.

Another influencing variable on the measured generator rotational speed $\omega_G^*$ is the difference between the actual value of the generator torque $M_{G,actual}$ and the torque $M_R$ divided by the ratio Ue, the torque $M_R$ being exerted by the rotor as a result of the wind. The difference corresponds to the effective torque acting on the generator shaft. Forming the difference is illustrated by the connection 32. Integrating or applying the transfer function 1/Js results in the compensated rotational speed $\omega_G$ of the generator. Forming the difference with the rotational speed value $Ue \cdot \omega_T$ in the connection 34 results in the rotational speed $\omega_G^*$ measured in the nacelle-fixed reference system.

Figure 4:
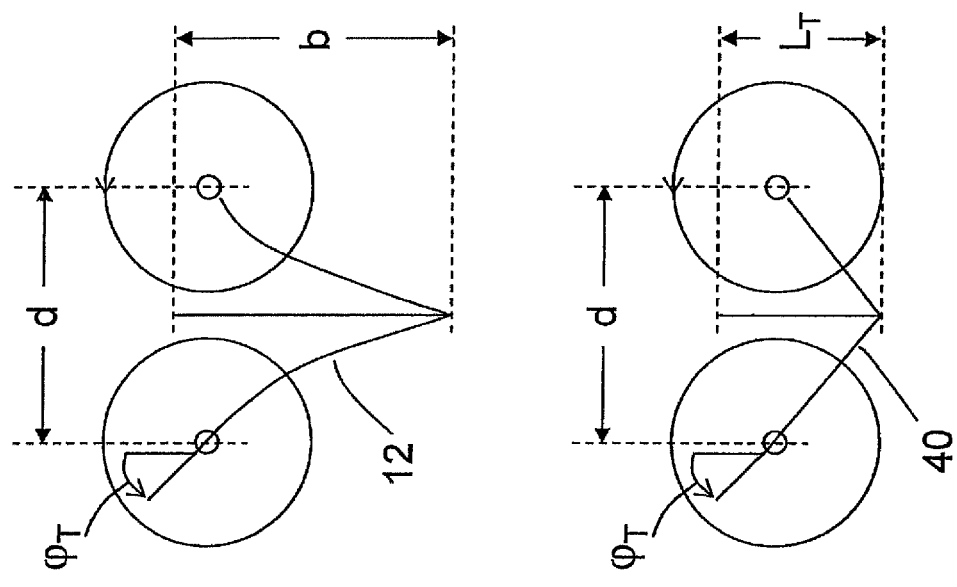
FIG. 4 shows a schematic illustration concerning the term effective tower height.

FIG. 4 serves to illustrate the effective tower height $L_T$. In the top area of the Figure, the ratios for a bending tower 12 with a real height b are shown during an oscillation. During an oscillation of the tower 12 with an amplitude d, a particular maximum value of the angle $\phi_T$ will result which, amongst other factors, is dependent on the bending of the tower 12.

In the lower area of FIG. 4, a model is sketched which is based on a rigid tower 40. The effective tower height $L_T$ is assumed, at which, in the case of such a rigid tower 40, the same angle $\phi_T$ of the nacelle is set at an amplitude d of the oscillation corresponding to the top part of the Figure.

It is understood that the foregoing description is that of the preferred embodiments of the invention and that various changes and modifications may be made thereto without departing from the spirit and scope of the invention as defined in the appended claims.

What is claimed is:

1. A method for controlling the rotational speed of a wind turbine having a tower, a nacelle mounted on the tower and a drive train which includes a rotor having at least one rotor blade, the rotor being rotatably mounted about a rotor axis in the nacelle, and a generator configured to be driven by the rotor; the method comprising the steps of:
   in a nacelle-fixed reference system, measuring the rotational speed ($\omega_G^*$) of an element of the drive train which rotates with the rotor in correspondence to a transmission ratio (Ue);
   measuring a movement of the nacelle relative to the ground;
   controlling the rotational speed to a rotational speed setpoint with a speed controller which outputs a generator torque ($M_G$) and/or a blade pitch angle ($\theta$);
   converting the rotational speed ($\omega_G^*$) into a corrected rotational speed ($\omega_{GC}$) which corresponds to the rotational speed of the rotor in a ground-fixed reference system multiplied by the transmission ratio (Ue); and,
   using the corrected rotational speed ($\omega_{GC}$) as the input quantity for the speed controller.

2. The method of claim 1, further comprising the steps of:
   determining a compensation rotational speed ($\omega_C$), which represents a rotation of the nacelle about the axis of the rotor, on the basis of the measured movement of the nacelle; and,
   adding the measured rotational speed ($\omega_G^*$) and the compensation rotational speed ($\omega_C$) to convert the measured rotational speed ($\omega_G^*$) into the corrected rotational speed ($\omega_{GC}$).

3. The method of claim 1, wherein the measuring of the movement of the nacelle is done by measuring an acceleration (a) in a direction which is orthogonal to the axis of the rotor and orthogonal to the longitudinal axis of the tower.

4. The method of claim 2, wherein the determination of the compensation rotational speed ($\omega_C$) includes dividing by an effective tower height ($L_T$) which is less than the actual height (b) of the tower.

5. The method of claim 1, wherein the movement of the nacelle is measured by measuring the angular acceleration about an axis of the rotor.

6. The method of claim 2, wherein the determination of the compensation rotational speed ($\omega_C$) includes integrating a measured acceleration as a function of time.

7. The method of claim 1, wherein the measurement of the movement of the nacelle is done by measuring an angle ($\phi_T$) of the nacelle about the axis of the rotor relative to the ground.

8. A wind turbine comprising:

a tower;

a nacelle mounted on said tower;

a drive train including a rotor and a generator configured to be driven by said rotor;

said rotor having at least one rotor blade and being rotatably mounted about a rotor axis in said nacelle;

a first measuring unit configured to measure a rotational speed ($\omega_G^*$) of an element of said drive train which rotates with said rotor in correspondence to a transmission ratio (Ue);

a second measuring unit configured to measure a movement of said nacelle relative to the ground;

a speed controller configured to control the rotational speed to a speed setpoint by outputting at least one of a generator torque ($M_G$) and a blade pitch angle ($\theta$);

a converting unit configured to convert said rotational speed ($\omega_G^*$) into a corrected rotational speed ($\omega_{GC}$) which corresponds to said rotational speed of said rotor in a ground-fixed reference system multiplied by said transmission ratio (Ue); and, said speed controller being connected to said converting unit in such a manner that said speed controller uses said corrected rotational speed ($\omega_{GC}$) as an input quantity.

9. The wind turbine of claim 8, wherein:

said converting unit is configured to determine a compensation rotational speed ($\omega_C$) on the basis of said measured movement of said nacelle wherein said compensation rotational speed ($\omega_C$) represents a rotation of said nacelle about said rotor axis; and, said converting unit is further configured to determine said corrected rotational speed ($\omega_{GC}$) by adding said measured rotational speed ($\omega_G^*$) and said compensation rotational speed ($\omega_C$).

10. The wind turbine of claim 8, wherein:

said tower defines a longitudinal axis; and, said second measurement unit is an acceleration sensor arranged so as to cause said acceleration sensor to measure the acceleration (a) of said nacelle in a direction which is orthogonal to said rotor axis and orthogonal to said longitudinal axis of said tower.

11. The wind turbine of claim 9, wherein:

said tower has an actual height (b) and an effective height ($L_T$) which is less than said actual height (b); and, said converting unit is configured to divide by said effective tower height ($L_T$) when determining said compensation rotational speed ($\omega_C$).

12. The wind turbine of claim 8, wherein said second measurement unit for measuring the movement of said nacelle is an angular acceleration sensor arranged so as to cause said angular acceleration sensor to measure the angular acceleration about said rotor axis.

13. The wind turbine of claim 9, wherein said converting unit is configured to integrate a measured acceleration as a function of time when determining said compensation rotational speed ($\omega_C$).

14. The wind turbine of claim 8, wherein said second measurement unit is an inclination sensor arranged so as to cause said inclination sensor to measure an angle of said nacelle about said rotor axis relative to the ground.

15. The wind turbine of claim 8, wherein said second measurement unit is a gyroscope sensor arranged so as to cause said gyroscope sensor to measure an angle of said nacelle about said rotor axis relative to the ground.

16. The wind turbine of claim 8, further comprising a nacelle-fixed system including said first measuring unit configured to measure said rotational speed ($\omega_G^*$) of said element.

* * * * *